(12) United States Patent
Chang

(10) Patent No.: US 7,407,318 B2
(45) Date of Patent: Aug. 5, 2008

(54) SPACER AND BACKLIGHT MODULE USING THE SAME

(75) Inventor: Shao-Han Chang, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 49 days.

(21) Appl. No.: 11/407,595

(22) Filed: Apr. 20, 2006

(65) Prior Publication Data
US 2007/0091584 A1  Apr. 26, 2007

(30) Foreign Application Priority Data
Oct. 21, 2005  (CN) .......................... 2005 1 0100582

(51) Int. Cl.
F21V 7/04 (2006.01)
F21S 4/00 (2006.01)
G09F 13/04 (2006.01)
G01D 11/28 (2006.01)

(52) U.S. Cl. .................. 362/632; 362/225; 362/97; 362/29

(58) Field of Classification Search ............... 362/600, 362/632, 634, 613, 614, 561, 633, 581, 97, 362/249, 396, 217, 219, 223–225, 222, 29, 362/30
See application file for complete search history.

(56) References Cited

U.S. PATENT DOCUMENTS

| 5,479,328 | A * | 12/1995 | Lee et al. ................ 362/216 |
| 6,840,656 | B2 * | 1/2005 | Kuo ........................ 362/330 |
| 6,974,221 | B2 * | 12/2005 | Wu et al. ................. 362/29 |
| 7,137,726 | B2 * | 11/2006 | Lee et al. ................ 362/632 |
| 7,163,328 | B2 * | 1/2007 | Chang et al. ............ 362/561 |
| 2002/0044437 | A1 | 4/2002 | Lee |
| 2003/0058635 | A1 * | 3/2003 | Matsui .................... 362/97 |
| 2004/0008512 | A1 | 1/2004 | Kim |
| 2005/0152124 | A1 * | 7/2005 | Tsai ........................ 362/30 |
| 2005/0162868 | A1 * | 7/2005 | Kim ........................ 362/632 |
| 2006/0120101 | A1 * | 6/2006 | Peng ....................... 362/561 |
| 2006/0158905 | A1 * | 7/2006 | Lai et al. ................. 362/634 |
| 2006/0203480 | A1 * | 9/2006 | Choi ....................... 362/225 |
| 2007/0109767 | A1 * | 5/2007 | Han et al. ............... 362/97 |
| 2007/0210694 | A1 * | 9/2007 | Kim et al. ............... 313/493 |

FOREIGN PATENT DOCUMENTS

JP    2004-327449 A    11/2004

* cited by examiner

Primary Examiner—John A Ward
Assistant Examiner—David R Crowe
(74) Attorney, Agent, or Firm—Morris Manning Martin LLP; Tim Tingkang Xia, Esq.

(57) ABSTRACT

A spacer includes a base, at least a supporting column, and at least a clamp. The base includes at least a bridge-shaped portion and at least a flat portion. The bridge-shaped portion includes a bridge top surface, and two curving sidewalls respectively extend from two ends of the bridge top surface and connect with the flat portion. The supporting column is disposed on the bridge top surface of the base. The clamp is disposed on the flat portion of the base. A backlight module using the same spacers is also provided. The backlight module has a reflective plate having a plurality of projections parallel to linear light sources. The spacers are coupled to the projections and support a diffusing plate. Curving sidewalls of the spacers and the adjacent curving surface of the projections facing the corresponding light sources would give the present spacer and backlight module have good optical uniformity.

17 Claims, 3 Drawing Sheets

SPACER AND BACKLIGHT MODULE USING THE SAME

TECHNICAL FIELD

The present invention relates to a spacer, and backlight module using the same, more particularly, to a bottom-lighting type backlight module for use in, for example, a liquid crystal display (LCD).

BACKGROUND

In a liquid crystal display device, liquid crystal is a substance that does not itself illuminate light. Instead, the liquid crystal relies on reflecting light from a light source, thereby displaying images and data. In the case of a typical liquid crystal display device, a backlight module powered by electricity supplies the needed light.

Typically, there are two types of backlight systems: an edge lighting type and a bottom-lighting type. The edge-lighting type of backlight system is widely used in small and medium size liquid crystal display for merits on its small weight, thin body and low energy cost. Large size liquid crystal display seldom uses the edge-lighting backlight system because the results based on the merits mentioned above is poor. Furthermore, the large size edge-lighting type backlight system seldom satisfies the requirement of light brightness and optical uniformity. Nowadays, the market demand for larger size liquid crystal display has increased progressively. Therefore, the bottom-lighting type of backlight system needs to be developed to satisfy the market demand.

Referring to FIG. 1, a typical bottom-lighting backlight module 10 is shown. The backlight module 10 includes a frame 11, a reflective plate 12, a diffusing plate 13, and a plurality of cold cathode fluorescent lamps 15. The frame 11 includes a flat substrate 112 and a number of circumferential sidewalls 114 extend from the substrate 112 to define an opening 116. The reflective plate 12 is disposed on the substrate 112 of the frame 11. The diffusing plate 13 is disposed on the opening 116 of the frame 11. The cold cathode fluorescent lamps 15 are positioned in the frame 11 under the diffusing plate 13. The diffusing plate 13 is used for uniformly diffusing the light emitted from the plurality of cold cathode fluorescent lamps 15.

However, in large sized backlight module, lengths of the cold cathode fluorescent lamps 15 are significantly long. Longer cold cathode fluorescent lamps 15 will distort at a higher range than its maximum flexibility causing it to break when subjected to vibrations from the liquid crystal display device. In addition, the sidewalls 114 of the frame 11 usually does not lend enough support to prevent the diffusing plate 13 from collapsing due to gravity, thus, the backlight module 10 may further includes a plurality of spacers disposed between the substrate 112 of the frame 11 and the diffusing plate 13, supporting the diffusing plate 13 and simultaneously clamping the cold cathode fluorescent lamps 15 to the reflective plate 12.

Referring to FIGS. 2 and 3, another typical bottom-lighting backlight module 30 is shown. The backlight module 30 includes a frame 31, a reflective plate 32, a diffusing plate 33, a plurality of cold cathode fluorescent lamps 35, and a plurality of spacers 20. The backlight module 30 is the same as the backlight module 10, except that the backlight module 30 further includes a predetermined amount of spacers 20 disposed between a substrate (not labeled) of the frame 31 and the diffusing plate 33. Each spacer 20 includes a flat base 22, a supporting column 24, two clamps 26, and two fasteners 28. The supporting column 24 is disposed on a middle portion of an upper surface of the flat base 22 for supporting the diffusing plate 33. The two clamps 26 are respectively disposed on two ends of the upper surface of the flat base 22 for fixing the two adjacent cold cathode fluorescent lamps 35. The fasteners 28 are disposed on two ends of the bottom surface of the flat base 22. The frame 31 and the reflective plate 32 respectively define a plurality of holes (not labeled) therein for receiving the fasteners 28. The spacers 20 are secured in the reflective plate 32 and in the substrate of the frame 31 by securing the fasteners 28 into the corresponding holes (not labeled) thereof.

However, the spacers 20 can be only used in backlight modules employing flat reflective plates, and such backlight modules has a lower optical uniformity.

What is needed, therefore, is a spacer, and backlight module using the same that overcome the above mentioned disadvantage.

SUMMARY

A spacer according to a preferred embodiment includes a base, at least a supporting column, and at least a clamp. The base includes at least a bridge-shaped portion and at least a flat portion. The bridge-shaped portion includes a bridge top surface, and two curving sidewalls that respectively extend from two ends of the bridge top surface connecting with the flat portion. The supporting column is disposed on the bridge top surface of the base. The clamp is disposed on the flat portion of the base.

A backlight module according to a preferred embodiment includes a frame, a diffusing plate, a reflective plate, a plurality of linear light sources and spacers. The frame includes a substrate and a plurality of circumferential sidewalls that extends from the substrate to define an opening. The diffusing plate is disposed on the opening of the frame. The linear light sources are aligned at predetermined locations in the frame under the diffusing plate. The reflective plate is disposed on the substrate of the frame. A plurality of projections extends out from the reflective plate towards the diffusing plate. A plurality of curving surfaces is defined by the substrate of the frame between the two adjacent projections. Each curving surface faces the corresponding linear light source. The same spacers as described in the previous paragraph are employed in this embodiment. The bridge-shaped portion of each spacer mates with the projections of the reflective plate. The spacers are respectively fixed on the projections of the reflective plate with the supporting columns thereof support the diffusing plate. Clamps of the spacers fix the corresponding linear light sources.

Other advantages and novel features will become more apparent from the following detailed description of the preferred embodiments, when taken in conjunction with the accompanying drawings.

BRIEF DESCRIPTION OF THE DRAWINGS

Many aspects of the spacer and the related backlight module having the same can be better understood with reference to the following drawings. The components in the drawings are not necessarily to scale, the emphasis instead being placed upon clearly illustrating the principles of the present spacer and the related backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present spacer and backlight module using the same, in detail.

Figure 1:
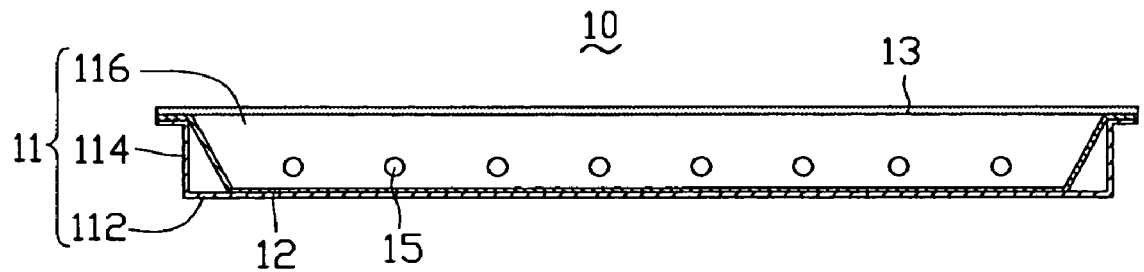
FIG. 1 is a schematic, cross-sectional view of a conventional bottom-lighting type backlight module.
Figure 2:
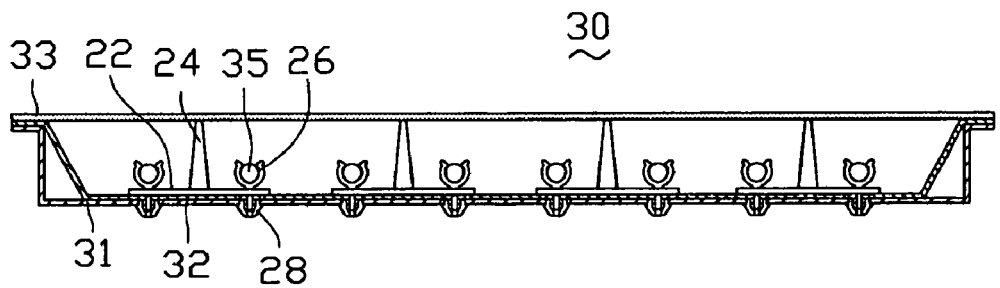
FIG. 2 is a schematic, cross-sectional view of another conventional bottom-lighting type backlight module using a plurality of typical spacers.
Figure 3:
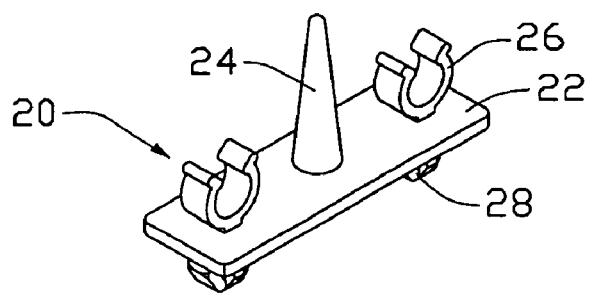
FIG. 3 is a schematic, perspective view of the spacer of the backlight module of FIG. 2.
Figure 4:
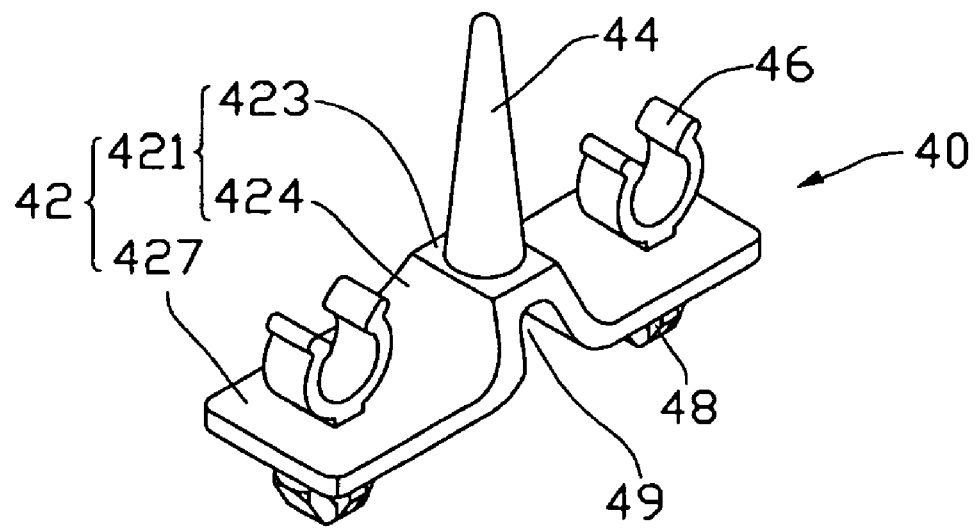
FIG. 4 is a schematic, perspective view of a spacer according to a first preferred embodiment.
Figure 5:
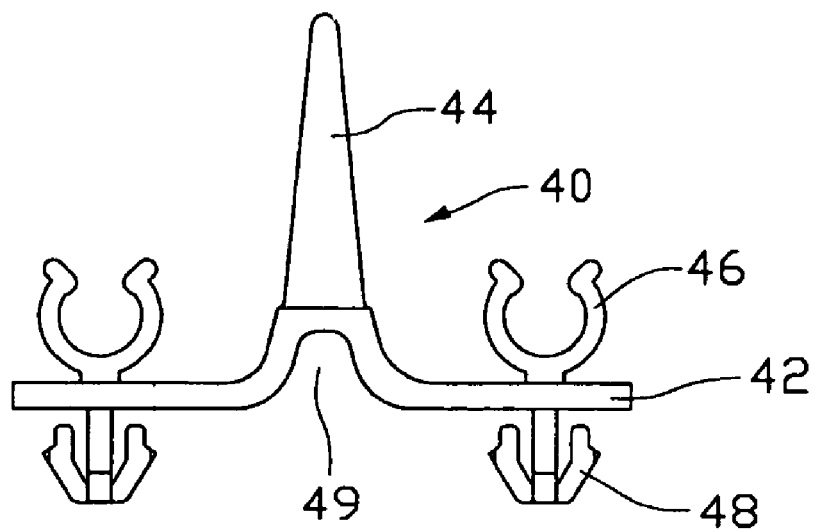
FIG. 5 is a front view of the spacer of FIG. 4.

Referring to FIGS. 4 and 5, a spacer 40 in accordance with a first preferred embodiment is shown. The spacer 40 includes a base 42, a supporting column 44, and two clamps 46. The base 42 includes a bridge-shaped portion 421 and two flat portions 427. The bridge-shaped portion 421 includes a bridge top surface 423, and two curving sidewalls 424 that respectively extends from two ends of the bridge top surface 423 and connects with the flat portion 427, thereby an arcuate channel 49 is defined by the bridge top surface 423 and the two curving sidewalls 424. The supporting column 44 is disposed on the bridge top surface 423. The flat portion 427 includes an upper surface (not labeled) and a bottom surface (not labeled) opposite to the upper surface. Two clamps 46 are disposed on spacer 40, one on each upper surface of the two flat portions 427. The supporting column 44 and the two clamps 46 are on the same side of the two flat portions 427. Each curving surface defined by the curving sidewalls 424 faces adjacent to clamp 46.

A shape of the clamp 46 can be selected from a group comprising of a similar C-shaped structure, a similar U-shaped structure or other suitable structures that can fix a linear light source conveniently. A material of the light guide plate can be selected from a group comprising of polymethyl methacrylate (PMMA), polycarbonate (PC), and other suitable transparent resin materials. In the illustrated embodiment, a shape of the clamp 46 is a similar U-shaped structure, and the spacer 40 is formed by PMMA.

It is to be understood that the spacer 40 may further includes two fasteners 48 disposed on the bottom surfaces of two flat portions 427, respectively. The fasteners 48 can be used to fix the spacer to a backlight module. In addition, the spacer 40 may further includes a high reflectivity film (not shown) deposited on the curving surfaces of the curving sidewalls 424 and the upper surface of the flat portions 427, so as to improve light energy utilization rate when used in backlight module.

Figure 6:
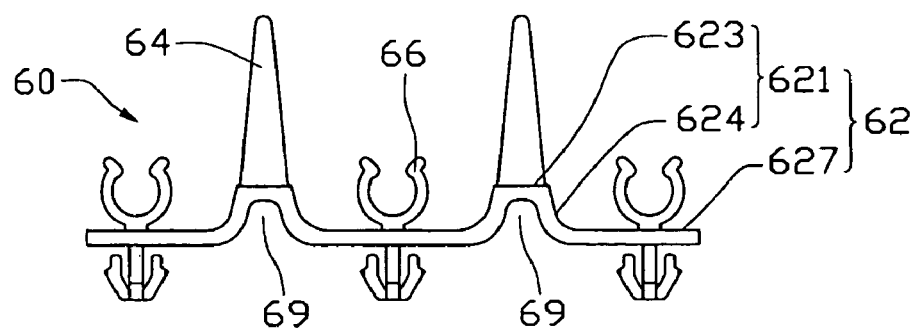
FIG. 6 is a front view of a spacer according to a second preferred embodiment.

Referring to FIG. 6, a spacer 60 in accordance with a second preferred embodiment is shown. The spacer 60 includes a base 62, two supporting columns 64 and three clamps 66. The base 62 includes two bridge-shaped portions 621 and three flat portions 627, wherein each pair of adjacent flat portions 627 are connected by the bridge-shaped portions 621. The bridge-shaped portion 621 includes a bridge top surface 623 with two curving sidewalls 624 each extending from the two ends of the bridge top surface 623. Each curving sidewalls 624 connects with an adjacent flat portion 627. The clamp 66 is positioned on each of the three flat portions 627 of the base 62.

It is noted that the present spacer can also be configured to have only one supporting column, only one bridge-shaped portion, and only one flat portion. The flat portion is connected with one of the curving sidewalls of the bridge-shaped portion, and the supporting column is positioned on a bridge top surface of the bridge-shaped portion. It is to be understood that a number of the present spacers can also be integrated with each other.

Figure 7:
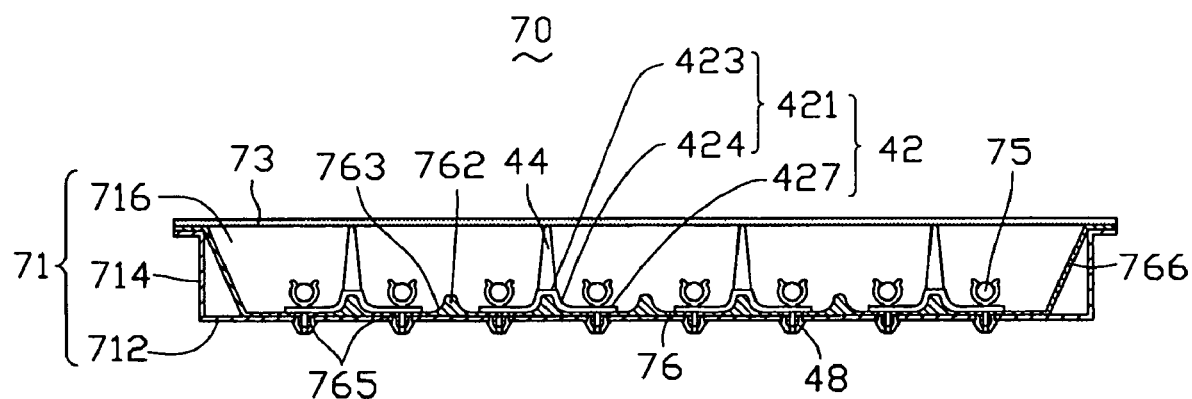
FIG. 7 is a schematic, cross-sectional view of a backlight module according to a third preferred embodiment.

Referring to FIG. 7, a backlight module 70 in accordance with a third preferred embodiment is shown. The backlight module 70 includes a frame 71, a diffusing plate 73 used as a light treatment means, a plurality of linear light sources 75, a reflective plate 76 used as a reflector, and a plurality of spacers 40. The frame 71 includes a substrate 712 and a plurality of circumferential sidewalls 714 extends from the substrate 712 to define an opening 716. The diffusing plate 73 is disposed on the opening 716 of the frame 71. Therefore, a chamber (not labeled) is defined within the diffusing plate 73, the substrate 712, and the sidewalls 714 of the frame 71. The linear light sources 75 are aligned in the chamber of the frame 71 facing the diffusing plate 73. The reflective plate 76 is disposed on the substrate 712 of the frame 71. A plurality of projections 762 extends out from the reflective plate 76 towards the diffusing plate 73. The projections 762 each extend along a direction parallel to the linear light sources 75 and are configured to be parallel (or at least essentially parallel) to each other. A plurality of curving surfaces 763 is defined by the substrate 712 of the frame 71 between two adjacent projections 762. Each curving surface 763 faces the corresponding linear light source 75 for improving optical uniformity. In this embodiment, the linear light source 75 is a cold cathode fluorescent lamp.

The arcuate channel 49 of each spacer 40 is configured to mate with the projections 762 of the reflective plate 76. Therefore, a predetermined number of spacers 40 can be fixed on the projections 762 of the reflective plate 76 with the supporting columns 44 thereof supporting the diffusing plate 73. A distance between two adjacent projections 762 of the reflective plate 76 is larger than a length of each flat portion 427 of the base 42.

In use, not only will the diffusing plate 73 directly above the linear light sources 75 have more incidence of light and illumination, other portions of the diffusing plate 73 above the left and right sides of the corresponding light sources 75 will also have more incidence of light and illumination because more light rays are reflected by the curving sidewalls 424 of the spacer 40 and the adjacent curving surface 763 of the projections 762 facing corresponding linear light sources 75, thereby a more uniform light density of the backlight module 70 is obtained. The diffusing plate 73 diffuses light emitted from the linear light sources 75 to uniformly diffuse light to a liquid crystal display panel (not shown), thereby widening a viewing angle.

To fix the spacers 40 onto the frame 71, the spacer 40 may further includes two fasteners 48, each disposed on the bottom surfaces of the two flat portions 427. A plurality of holes 765 that lies directly adjacent to fasteners 48 are cut through the frame 71 and reflective plate 76, for receiving the fasteners 48. The spacers 40 are fixed in the reflective plate 76 and the substrate 712 of the frame 71 by securing the fasteners 48 into the corresponding holes 765 thereof. It is to be understood that the spacer 40 may further includes other suitable latching elements disposed on the bottom surfaces of the flat portions 427 thereof for being fixed to the frame 71 of the backlight module 70, for example, a plurality of small columns (not shown) are defined on each bottom surface of the flat portions, which can be secured in the holes 765 of the reflective plate and the frame by a number of screws (not shown) outside of the frame 71. In addition, the spacer 40 can also be attached to the reflecting plate 76 by using a bond or a double-coated adhesive tape.

The backlight module 70 may further includes a plurality of side reflective plates 766 extending from the reflective plate 76 and connecting with the sidewalls 714 of the frame 71 for an improved utilization efficiency of light energy. In addition, the backlight module 70 may further includes a number of optical corrective films such as a prism sheet or a polarized sheet stacked on the diffusing plate 73, so as to improve the backlight module 70's optical uniformity.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A spacer comprising:
   a base having:
      at least one bridge-shaped portion and at least one flat portion, wherein the bridge-shaped portion includes a bridge top surface, and two curving sidewalls respectively extending downwards from two ends of the bridge top surface, wherein an end of the at least one flat portion connects with an end of one of the two curving sidewalls, and the at least one flat portion is located at a side of the bridge-shaped portion;
   at least one supporting column disposed on the bridge top surface of the base; and
   at least one clamp disposed on the at least one flat portion of the base.

2. The spacer according to claim 1, further comprising at least one fastener member disposed on the flat portion, the fastener and the clamp respectively being disposed at the two sides of the flat portion.

3. The spacer according to claim 1, wherein curving surfaces of the curving sidewalls faces the adjacent clamp.

4. The spacer according to claim 1, further comprising a high reflectivity film deposited on curving surfaces of the curving sidewalls and the upper surface of the flat portions.

5. The spacer according to claim 1, wherein a shape of the clamps is selected from a group comprising of a C-shaped structure and a U-shaped structure.

6. The spacer according to claim 3, wherein a material of the spacers is selected from a group comprising of polymethyl methacrylate (PMMA), polycarbonate (PC), and other suitable transparent resin materials.

7. A backlight module comprising:
   a frame having a substrate and a plurality of circumferential sidewalls that extends from the substrate to define an opening;
   a diffusing plate disposed above the opening of the frame;
   a plurality of linear light sources arranged in the frame under the diffusing plate;
   a reflective plate disposed on the substrate of the frame, wherein the reflective plate defines a plurality of projections extending out towards the diffusing plate, and a plurality of curving surfaces are defined by the projections of the reflective plate, each curving surface facing the adjacent light source; and
   at least one spacer disposed between the diffusing plate and the reflective plate, each spacer including:
      a base having at least one bridge-shaped portion mated with the curving surfaces of the projections and at least one flat portion, wherein the bridge-shaped portion includes a bridge top surface, and two curving sidewalls respectively extending from two ends of the bridge top surface and connecting with the flat portion;
      at least one supporting column disposed on the bridge top surface for supporting the diffusing plate; and
      at least one clamp disposed on the at least one flat portion for fixing the linear light source.

8. The backlight module according to claim 7, further comprising a plurality of side reflective plates extending from the reflective plate and connecting with the sidewalls of the frame.

9. The backlight module according to claim 7, wherein the spacer may further includes a plurality of fasteners disposed on one surface facing the reflective plate of the flat portions, and the frame and reflective plate respectively defines a plurality of corresponding holes therein for receiving the fasteners.

10. The backlight module according to claim 7, wherein the spacer may further includes a plurality of columns disposed on one surface of the flat portions facing the reflective plate, and the frame and reflective plate respectively define a plurality of corresponding holes therein for receiving the columns that are fixed to the frame by a plurality of screws outside of the frame.

11. The backlight module according to claim 7, wherein each spacer is attached to the reflecting plate by using a bond or a double-coated adhesive tape.

12. The backlight module according to claim 7, wherein a distance between two adjacent projections of the reflective plate is larger than a length of each flat portion of the base of the spacer.

13. The backlight module according to claim 7, wherein curving surfaces of the curving sidewalls face the adjacent clamp.

14. The backlight module according to claim 7, further comprising a high reflectivity film deposited on curving surfaces of the curving sidewalls and the upper surface of the flat portions.

15. The backlight module according to claim 7, wherein a shape of the clamps is selected from a group comprising of a C-shaped structure, and a U-shaped structure.

16. The backlight module according to claim 7, wherein the light source is selected from the group comprising light emitting diodes and cold cathode fluorescent lamps.

17. The backlight module according to claim 7, further comprising a number of optical corrective films stacked on the diffusing plate, the optical corrective films being one of a prism sheet or a polarized sheet.

* * * * *